Aug. 8, 1967                E. W. ENTERS                3,334,911
ADJUSTABLE WHEEL MOUNT
Filed Dec. 16, 1965                                2 Sheets-Sheet 2
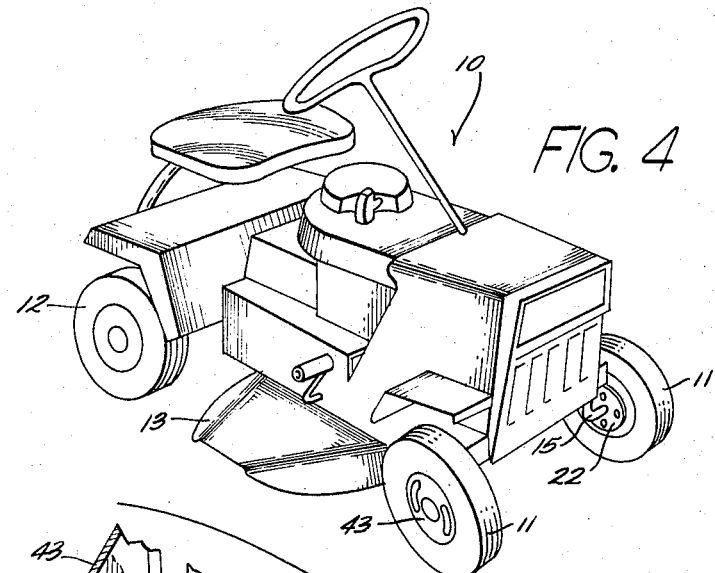
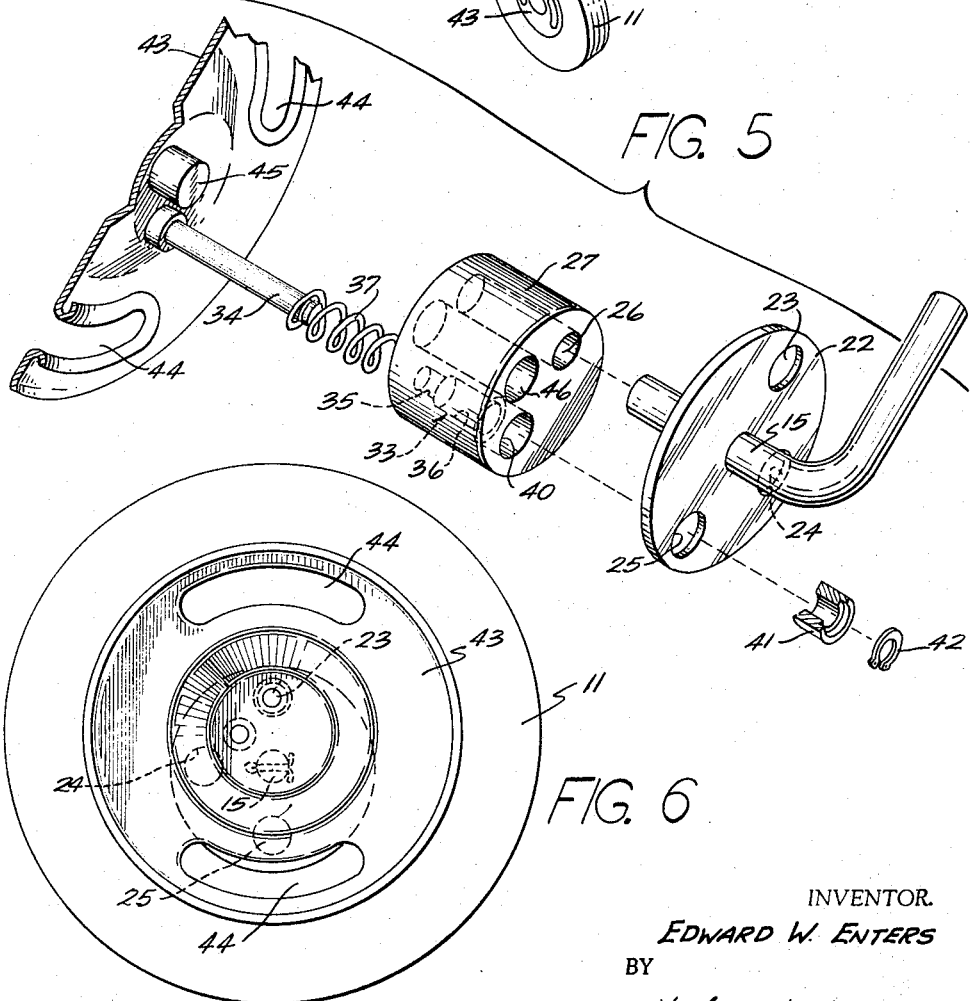
INVENTOR.
EDWARD W. ENTERS
BY
*Wheeler, Wheeler & Wheeler*
ATTORNEYS United States Patent Office 3,334,911
Patented Aug. 8, 1967

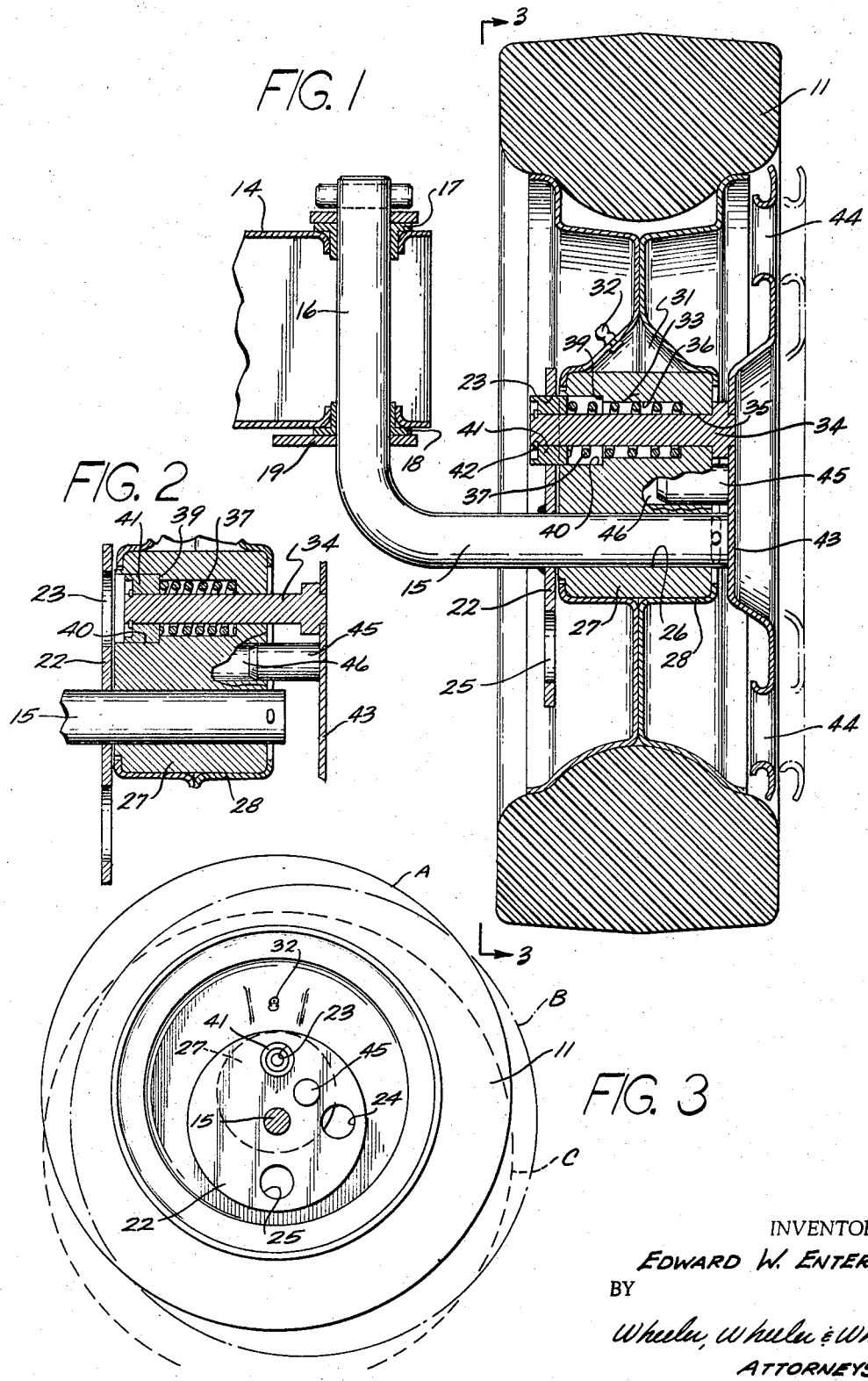

3,334,911
ADJUSTABLE WHEEL MOUNT
Edward W. Enters, Fredonia, Wis., assignor to Gilson
Bros. Co., Plymouth, Wis., a corporation of Wisconsin
Filed Dec. 16, 1965, Ser. No. 514,230
10 Claims. (Cl. 280—43)

This invention relates to an adjustable wheel mount.

As disclosed herein, a wheel mount embodying the invention is provided for each front wheel of a riding mower, for the purpose of adjusting the cutting height of the mower blade. The wheel mount has utility in other environments in which it is desired to afford adjustability.

The wheel mount incorporates a wheel support hub eccentrically turnable on a support spindle which also carries a latch plate or flange having a series of arcuately spaced latch detent sockets. The hub has a latching detent or stud selectively receivable in one or another of the flange sockets to latch the hub in one of several positions. By turning the hub from one position to the other about its eccentric bearing on the spindle, the wheel is raised and lowered with respect to the spindle and, accordingly, will carry the mower and its cutting blade at different levels, depending upon the adjustment.

Each of the front wheels is separately adjustable as to height. In normal course, both wheels will be concurrently adjusted to be at the same height with respect to the mower. All the adjusting mechanism is carried within the wheel. Accordingly, the arrangement is very compact, relatively inexpensive and requires little maintenance and service. There are no projecting parts such as levers, swing arms, pedals, etc., to clutter the appearance of the mower and constitute a safety hazard.

Other objects, features and advantages of the invention will appear from the following disclosure in which:

FIG. 1 is a vertical cross section taken through a wheel mount embodying the present invention, the wheel being latched in one of its adjusted positions.

FIG. 2 is a fragmentary vertical section through the hub of the structure shown in FIG. 1, but showing the latching detent stud withdrawn from engagement with a flange socket, preliminary to turning the hub to a different position of adjustment.

FIG. 3 is a reduced scale diagrammatic view, generally along the line 3—3 of FIG. 1, illustrating the various positions of adjustment of the wheel with respect to its support spindle.

FIG. 4 is a perspective view of a riding mower having front wheels embodying the adjustable height mount of the present invention.

FIG. 5 is an exploded fragmentary perspective view of the wheel assembly of the present invention.

FIG. 6 is a side elevation of a wheel incorporating a mount embodying the present invention.

Although the disclosure hereof is detailed and exact to enable those skilled in the art to practice the invention, the physical embodiments herein disclosed merely exemplify the invention which may be embodied in other specific structures. The scope of the invention is defined in the claims appended hereto.

As illustrated in FIG. 4, the adjustable wheel mount of the present invention is incorporated in a riding mower 10 having a pair of front wheels 11 and a pair of rear wheels 12. The rear wheels are on a fixed position driven axle, and there is no provision for height adjustment thereof. Each front wheel 11 is provided with an adjustable height wheel mount as hereinafter described.

Intermediate its front wheels 11 and rear wheels 12 the mower 10 is provided with a mower blade housing 13 in which a conventional horizontal rotary cutting blade is confined. The raising and lowering of the front wheels 11 adjusts the cutting height of the blade with respect to the turf.

As best shown in FIG. 1, the front fixed axle 14 of the mower 10 is provided at each end with a laterally projecting spindle 15 which has an upright pivot pin portion 16 journaled for rotation on the axle 14 on suitable bearings 17, 18. The wheels 11 are steered by steering mechanism including crank 19.

The laterally projecting spindle 15 for each wheel 11 has securely welded thereto a latching plate or flange 22 which is desirably disk-shaped and is provided in an arcuate series about the spindle axis with latch detent sockets 23, 24, 25. In the embodiment illustrated, three such sockets are shown, although the specific number of sockets is optional.

Beyond the latch flange 22, spindle 15 is in bearing engagement in an eccentrically located bearing bore 26 of wheel hub 27. Hub 27 is desirably made of bearing metal, and the wheel 11 has a hub sleeve 28 freely rotatable thereon. As illustrated in FIG. 1, hub sleeve 28 is provided with a grease chamber 31 having a grease fitting 32 by which the bearing 27, 28 is lubricated.

Hub 27 has a stepped bore 33 parallel to bore 26 to provide a chamber for a reciprocating latching detent mounted on stem 34. Stepped bore 33 has a small bore portion 35 of just sufficient size to slidably receive the latching stem 34. Bore 33 has a second counterbored portion 36 somewhat larger than the stem 34 to provide a chamber to receive a helical compression spring 37. Bore 33 has a still larger counterbored portion 40 to receive a detent stud in the form of a wear collar 41 which is attached to the end of stem 34 by a snap ring 42. Spring 37 seats on one side of collar 41 to bias latching detent toward the fixed latch flange 22 and snap the collar 41 of the detent into any one of the sockets 23, 24, 25 with which it happens to align. As shown in FIG. 1, the latching detent is engaged with the top socket 23 in flange 22, thus to supoprt the mower axle 14 in its lowermost position.

The opposite end of stem 34 is fixed to a latch handle disk 43 which has finger receiving openings 44. An operator can gasp the latch disk 43 through openings 44 and by pulling to the right, as indicated by the dotted line position of the disk 43 in FIG. 1, can withdraw the latch detent 41 to the right, thus to compress spring 37 and withdraw the detent 41 from engagement with the flange socket 23. This is illustrated in FIG. 2. Outward movement of the handle disk 43 is limited by abutment of the detent collar 41 with the shoulder 39 on bore 40. Hub 27 may now be turned about its eccentric axis on spindle 15, thus to align the latching detent with one of the other flange sockets 24, 25. Release of pulling pressure on the handle disk 43 will then permit spring 37 to snap the detent 41 into such other socket, thus to latch the wheel in another position of height adjustment.

To insure that the hub 27 will turn in response to imposition of torque upon the handle disk 43, the disk is provided with a torque transmitting lug 45 which has a lost motion or slidable connection with another socket bore 46 formed in hub 27. Lug 45 consists of a stem having sufficient length to remain in thrust transmitting connection with the socket 46 of the hub 27 in all positions of disk 43. As shown in FIG. 1, the torque lug 45 is more or less fully engaged in socket 46. Even in the fully retracted position of the latching stem 34, a part of torque lug 45 remains in the bore 46, as shown in FIG. 2. Accordingly, imposition of turning torque on the handle disk 43 will rotate the hub 27 about the eccentric axis of spindle 15.

FIG. 3 illustrates the various positions of the wheel. In position A, the wheel is shown in full lines. Latching detent 41 is engaged in flange socket 23 to support the mower in its lowermost position. In position B, the wheel is shown in dash-dot lines, in position where the mower is supported in an intermediate height position. In position C, the wheel is shown in dashed lines, in position where the mower is supported at its highest level.

From the foregoing, it is clear that the support position of the wheel respecting the mower is adjusted simply by pulling out on the handle disk 43 far enough to release latching detent 41 from the flange socket in which it was engaged. Rotation of handle disk 43 will turn the hub 27 to a new position in which detent 41 aligns with another flange socket. If, meanwhile, outward axial pressure on handle 43 has been relaxed, spring 37 will snap the latching detent 41 into place into the flange socket with which it has been newly aligned. Height adjustment has thus been effectuated in a simple pull and twist motion.

I claim:
1. An adjustable wheel mount comprising:
   a fixed latch plate,
   a spindle extending from said plate,
   a wheel hub having a wheel rotatably mounted thereon, said wheel hub being eccentrically mounted on said spindle,
   said plate having a series of arcuately spaced detent sockets about said spindle,
   said hub having a retractable latching detent selectively receivable in one or another of said detent sockets to latch the hub in one of several positions thereof about said spindle,
   and a handle on said latching detent by which the detent is manipulated in the course of shifting the hub from one position to another.

2. The adjustable wheel mount of claim 1 in which said mount is provided with a spring biasing the detent toward contact with said latch plate whereby the detent will snap into a detent socket when it registers therewith.

3. The adjustable wheel mount of claim 1 in which said handle comprises a disk having finger grips at opposite sides of its connection to the latching detent.

4. The adjustable wheel mount of claim 1 in which said handle has a torque lug in lost motion connection with the hub whereby to transmit turning torque to the hub when the latching detent is withdrawn from a flange socket.

5. The adjustable wheel mount of claim 4 in which said torque lug comprises a stem on the handle, said hub having a socket with which the stem is slidably engaged in all positions of the handle.

6. The adjustable wheel mount of claim 1 in which said handle has a torque lug, said hub having a socket in which the torque lug slides for lost motion torque transmitting connection with the hub, a spring biasing the lug into the socket, and means limiting movement of the lug out of the socket whereby the torque lug remains in torque transmitting connection to said hub socket when the latching detent is free of the detent sockets.

7. The adjustable wheel mount of claim 1 in combination with a mower having front wheels, rear wheels and a mower intermediate said front and rear wheels, each said front wheel having one of said adjustable wheel mounts.

8. In a four wheel mower having a pair of front wheels, a pair of rear wheels, and a mower intermediate said front and rear wheels, the improvement in said front wheels consisting for each wheel an adjustable wheel mount within the wheel and comprising a support spindle, an eccentrically mounted wheel hub on the spindle, a wheel rotatably mounted on said hub, and a latching detent to latch the hub in one or another of several eccentric positions about the spindle, said latching detent including a lock stem having a handle by which the stem is moved laterally of the plane of the wheel rotation between detent latched and detent released positions.

9. In a four wheel mower having a pair of front wheels, a pair of rear wheels, and a mower intermediate said front and rear wheels, the improvement in said front wheels consisting for each wheel an adjustable wheel mount within the wheel and comprising:
   a support spindle,
   an eccentrically mounted wheel hub on the spindle,
   a wheel rotatably mounted on said hub,
   a latching detent,
   a fixed latch plate,
   said spindle extending from said plate,
   said plate having a series of arcuately spaced detent sockets about said spindle,
   said latching detent being selectively receivable in one or another of said detent sockets to latch the hub in one of several positions thereof about said spindle,
   and a handle on said latching detent by which the detent is manipulated in the course of shifting the hub from one position to another.

10. The mower of claim 9 in which said handle has a torque lug, said hub having a socket in which the torque lug slides for lost motion torque transmitting connection with the hub, a spring biasing the lug into the socket, and means limiting movement of the lug out of the socket whereby the torque lug remains in said hub socket when the latching detent is free of the detent sockets.

References Cited

UNITED STATES PATENTS

| | | | |
|---|---|---|---|
| 1,259,962 | 3/1918 | Cormack | 280—43 |
| 1,333,441 | 3/1920 | Ostrander | 16—19 |
| 2,145,219 | 1/1939 | Burton | 280—43 X |
| 2,680,339 | 6/1954 | Murphy | 280—43 X |
| 2,786,541 | 3/1957 | Conrad | 280—43 X |
| 2,915,318 | 12/1959 | Chesser | 280—43 |

BENJAMIN HERSH, *Primary Examiner.*

CHARLES C. PARSONS, *Assistant Examiner.*